March 17, 1964  D. C. SCHLUDERBERG  3,125,158
GAS-SOLIDS HEAT TRANSPORT SYSTEM
Filed June 21, 1960
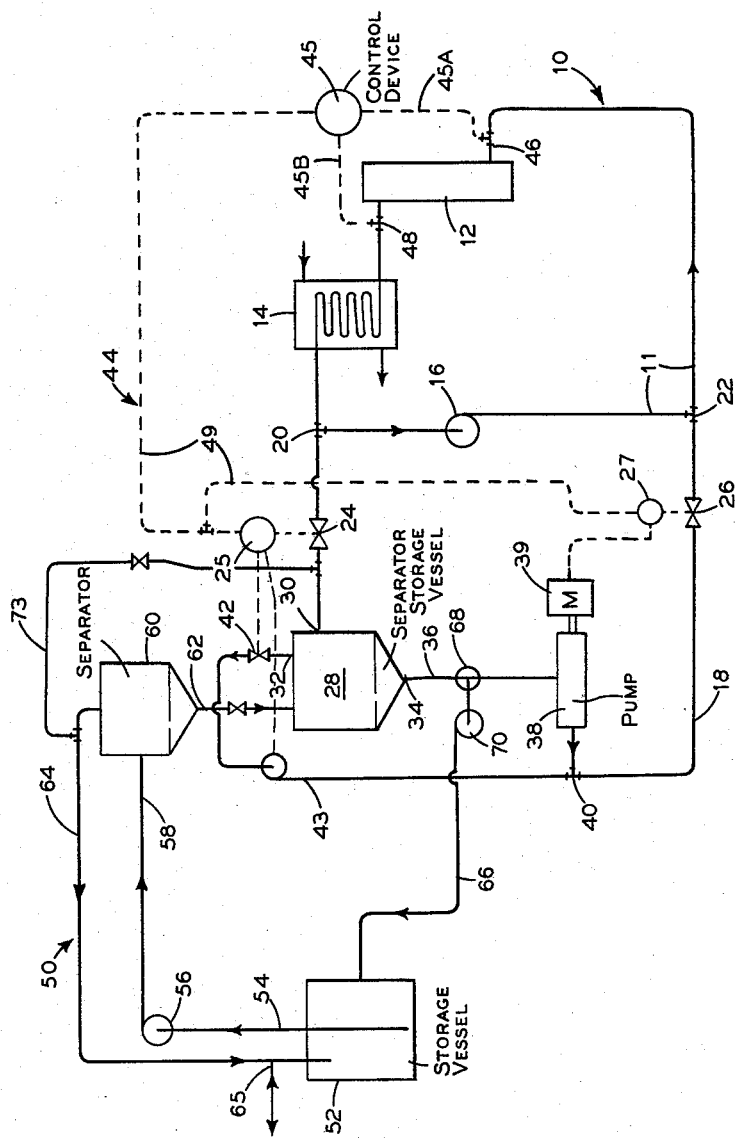
INVENTOR.
Donald C. Schluderberg
BY
ATTORNEY United States Patent Office 3,125,158
Patented Mar. 17, 1964

3,125,158
GAS-SOLIDS HEAT TRANSPORT SYSTEM
Donald C. Schluderberg, Lynchburg, Va., assignor to The Babcock & Wilcox Company, New York, N.Y., a corporation of New Jersey
Filed June 21, 1960, Ser. No. 37,771
4 Claims. (Cl. 165—39)

This invention relates in general to a heat transport system using a coolant containing fine solid particles suspended in a gas for transporting heat and, more particularly to apparatus for varying the concentration of the fine solid particles in the coolant so that the inlet and outlet temperatures of the coolant within a heat generating zone can be maintained substantially constant, while removing variable amounts of heat from the zone.

The abilitiy of a heat transport system to carry off variable quantities of heat from a heat source without variations in the inlet and outlet temperatures has many advantages. The various components involved can be designed without concern for thermal stressing which might be caused by undue variations in temperature. The heat source can be safely operated without the fear that excessive temperatures will cause failure of the components within the heat source cycle. Further, maintaining constant inlet and outlet temperatures will provide for higher operating efficiency of the heat source over a wide range of heat output.

The present invention provides an arrangement for varying the proportionate amount of solids in a coolant which contains fine solid particles suspended in a gas and is circulated in a closed coolant circuit in a heat transport system. To change the solids concentration in the coolant, a coolant by-pass circuit is connected at both its inlet and outlet ends to separate parts of the closed coolant circuit so that the mixture of fine solid particles and gas may be selectively removed from the closed circuit and either a light phase or a heavy phase of the mixture can be selectively added back into the closed circuit. A separator is positioned in the by-pass coolant circuit to receive the coolant removed from the closed coolant circuit and to separate it into its light and heavy phases. The heavy phase contains a predominantly greater part of the fine solid particles of the mixture while the remaining small portion of fine solid particles contained in the light phase gives it an appearance similar to a very dense smoke.

The light phase can be returned directly to the by-pass circuit from the separator while the heavy phase is passed from the separator into a heavy phase storage vessel. The heavy phase storage vessel is connected to the by-pass circuit so that the heavy phase can be regulatably returned to the by-pass circuit. Valves are arranged in the by-pass circuit to regulate the flow of both the light phase and the heavy phase into, out of, and through the by-pass circuit. A control system regulates the valves in the by-pass circuit in response to variations in the quantity of heat produced in the heat source of the heat transport system.

In addition, the present invention provides apparatus for transporting fine solid particles to the heat transport system without any loss of the particles due to leakage in the course of their transportation.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

The drawing is a schematic diagram of a heat transport system 10 and a fine solids transport system 50 embodying the present invention. The heat transport system comprises a closed coolant circuit 11 and a by-pass coolant circuit 18. In the closed circuit 11 there are located a vessel 12 containing a heat source, a heat exchanger 14 and a coolant pump 16. A coolant containing fine solid particles suspended in a gas is circulated continuously through the closed circuit 11 by means of the coolant pump 16. The coolant flows through the vessel 12 where it absorbs heat and then through the heat exchanger 14 wherein it gives up its heat to a secondary coolant by indirect contact.

A heat transport system, in which the present invention can be employed, is set forth in co-pending application Serial No. 773,974 filed November 14, 1958 now Patent No. 3,063,926, granted November 13, 1962. The use of a coolant which combines a gas having low corrosive characteristics with a suspension of fine solid particles permits its use as a fluidized heat transport medium with the advantages accruing from the high heat transport qualities of the fine solid particles.

The fine solid particles referred to herein may be selected from any one of the following group of oxides and carbides of aluminum, beryllium, zirconium and also solid carbon in its various forms such as graphite, lampblack and charcoal. As regards size, the fine solid particles discussed herein have a major dimension of about 10 microns or less. The fine solid particles and gas are mixed in a proportion of greater than 10 pounds of solids per pound of gas. The carrier gas is selected on the basis of desired system pressure and materials compatability of the gas with the suspended particles and loop components under system operating conditions. Possible choices for the carrier gas include nitrogen, air, carbon dioxide, helium, neon and argon.

The coolant by-pass circuit 18 is connected to the closed circuit 11 at by-pass inlet 20 located in the line between the heat exchanger 14 and the coolant pump 16, and at by-pass outlet 22 in the line between the coolant pump 16 and the vessel 12. To control flow into and out of the by-pass circuit, an inlet valve 24 and an outlet valve 26 are positioned in the by-pass circuit close to the inlet 20 and the outlet 22 respectively. Inlet valve 24 with its control device 25 and outlet valve 26 with its control device 27 permit flow within the by-pass circuit 18. At a point in the by-pass conduit downstream from the inlet valve a combination separator-storage vessel 28 is positioned to receive the flow of coolant which enters the by-pass circuit. The separator-storage vessel 28 has a coolant inlet 30 and a light phase outlet 32 in its separator portion and a heavy phase outlet 34 from its storage portion.

From the separator-storage vessel 28 a heavy phase conduit 36, connects the heavy phase outlet 34 with a heavy phase pump 38. This pump in turn is connected to the by-pass circuit at heavy phase inlet 40 positioned between the separator-storage vessel 28 and the outlet valve 26. The pump 38 receives its power from a drive mechanism 39 which is actuated by the control device 27.

A shut-off valve 42 is located in the light phase carrying portion of the by-pass circuit 18 between the light phase outlet 32 and the heavy phase inlet 40 to prevent a flow of heavy phase back into the separator-storage vessel through the light phase outlet when the heavy phase pump 38 is in operation. This valve 42 is actuated by the control device 25 which also simultaneously actuates inlet valve 24. Pump 43 which is also actuated by the control device 25, is positioned in the by-pass circuit between shut-off valve 42 and the heavy phase inlet 40.

A control system 44 is arranged to regulate the operation of the coolant by-pass circuit 18 in response to variations in the rate of heat generated within the vessel 12. Control device 45, through the lines 45A and 45B, constantly monitors the inlet and outlet temperatures of the coolant at junction points 46 and 48 respectively to detect changes in these temperatures since they are indicative of the rate of heat generation in the vessel. It is contemplated that any of the control systems known in the art which employ temperature sensing devices to provide the means for actuating the controls, can be used. The control device 45 also is connected by the line 49 to control devices 25 and 27 whereby these control devices may be operated to effect flow of coolant through the circuit.

The fine solids transport system 50 is arranged to supply fine solid particles to the separator-storage vessel 28 in the by-pass circuit 18. This system comprises a closed solids storage container 52 connected by a conduit 54 with a pump 56 which in turn is connected through a conduit 58 with a separator 60 which has a light phase-heavy phase separator portion and a heavy phase collection space. The heavy phase collection space in the lower portion of the separator 60 is connected to the separator-storage vessel 28 by means of a valved conduit 62. The upper portion of the separator 60, where the light phase collects, is connected to the storage container 52 by a conduit 64, with a connection 65 provided therein to permit the supply of or removal of gas from the transport system 50.

The conduit 36, which is used for removing the heavy phase portion of the mixture of gas and fine solid particles from the separator-storage vessel 28, is connected to the by-pass coolant circuit 18, using a three-way valve 68 which permits routing the heavy phase either to the by-pass circuit 18 or to the storage container 52 by means of a pipe 66. A pump 70 is positioned in the conduit 66 to assist in the flow of solids therethrough. A valve line 72 connects the conduit 64 with the by-pass circuit 18 at a point between the inlet valve 24 and the separator-storage vessel 28.

For a better understanding of the invention, a detailed example of its operation follows:

In the closed coolant circuit 11 the coolant circulates continuously without any change in the gas-solids proportions as long as the quantity of heat generated per unit of time in the chamber 12 remains constant. When the rate of heat generation changes, the control system 44 changes the proportionate amount of the fine solid particles necessary to dissipate the heat being generated through the control device 45 which continuously monitors the inlet and outlet temperatures of the fluid in vessel 12.

When the amount of heat generated per unit of time within the vessel 12 increases it then becomes necessary to increase the proportion of the fine solid particles suspended in the gas in order to remove the heat and thereby maintain the desired inlet and outlet temperatures to the vessel. When such a circumstance occurs, the control device 45 actuates the controls for the inlet valve 24, the outlet valve 26 and the drive mechanism for the solids pump 38; at the same time maintaining closed the shut-off valve 42 and pump 43 in the by-pass coolant circuit while the three-way valve 68 is set to permit delivery of solids to the pump 38. In operation the pump 38 receives a volume of the heavy phase from the storage portion of the separator-storage vessel 28 equal to the volume of coolant removed from the closed circuit 11 and delivered to the separator-storage vessel 28. The light phase is not returned to the by-pass circuit 18 but remains in the separator-storage vessel 28. The pump 38 discharges the heavy phase into the by-pass conduit through inlet 40. The heavy phase passes through the outlet valve 26 into the closed coolant circuit 11 for flow therethrough. When the desired solids concentration within the closed coolant circuit is reached, the control system 44 shuts down the pump 38 and closes the valves 24 and 26 so that there is no longer any change made to the solids concentration of the coolant flowing through the closed coolant circuit. At the same time the valve 68 is returned to its full closed position.

When the rate of heat generation within the vessel 12 drops off, the control system 44 causes inlet valve 24, shut-off valve 42 and outlet valve 26, to open, thereby permitting a selective amount of coolant to enter into the by-pass circuit and flow into the separator-storage vessel 28 and also causes pump 43 to be placed in operation. In the separator portion of the separator-storage vessel 28 the coolant is separated into its light phase and heavy phase with the heavy phase settling in the storage section, while the light phase flows through the outlet 32 and into the pump 43 which passes it through the by-pass circuit 18, entering the closed coolant circuit 11 at the outlet 22. This arrangement for removing a portion of the coolant containing fine solid particles and separating and returning only the light phase to the closed coolant circuit 11 produces a dilutant effect and thereby reduces the proportionate amount of the fine solid particles in the coolant. When the desired solids concentration is reached the control system reacts to close the inlet, outlet and shut-off valves 24, 42 and 26 respectively and to shut-down pump 43 and the coolant continues to flow through the coolant circuit at the established solids/gas ratio as long as the rate of heat generation within the vessel 12 remains constant.

If, during the operation of the heat transport system 10, it becomes necessary either to add or to remove solids from the combination separator-storage vessel 28, the fine solids transport system 50 can be placed in operation. In this system, if solids are to be added to the separator-storage vessel 28 in the by-pass circuit, carrier gas can be admitted through connection 65 to the transport system 50. The solids are fluidized within the conduit 54 by the suction of the gas-solids pump 56 which pumps them through conduit 58 into the separator 60, where the gas-solids mixture is separated into a light phase and a heavy phase. The heavy phase passes into the storage portion of the separator 60 and from there through valved conduit 62 to the combination separator-storage vessel 28 for use in the heat transport system 10. The light phase leaves the separator 60 and returns to the storage container 52 by way of the conduit 64 thereby avoiding any loss of the light phase due to leakage.

If it becomes necessary to remove some of the heavy phase of the gas-solids mixture from the separator-storage vessel 28, then the three-way valve 68 in the heavy phase conduit 36 is opened to permit the flow of the heavy phase into the pipe 66. The pump 70 flows the heavy phase through this pipe into the storage container 52 and light phase flows back to the separator through the conduit 64 and the valved line 72, which is closed during addition of the heavy gas to the separator-storage vessel 28.

With the use of the arrangement set forth herein, it is possible to use a coolant comprising fine solid particles suspended within a gas in which the solids/gas proportions of the coolant may be varied to provide for variable operation of the heat source. Additionally, the fine solids transport system 50 provides an arrangement by which solid particles may be supplied to a heat transport system without any loss due to leakage. It should be noted that the heat transport system will operate effectively without being used in combination with the fine solids transport system.

In the syestem described herein the separation of the coolant into its light and heavy phases can be achieved, for example, by the use of a separator of the cyclone type. While the system operates satisfactorily when a light phase and heavy phase separation is used it could also be operated using a total separation of the gas and fine solid particles. Total separation of the coolant can be obtained by providing a final separation using electrostatic separators or precipitators.

The closed coolant circuit will operate at substantially constant pressure though changes are made in the concentration of the solids flowing in the carrier gas. It is possible to have the closed coolant circuit operated under variable pressure conditions by adding the heavy phase mixture of the gas and fine solid particles without any equivalent removal of coolant from the closed coolant circuit. However, variable pressure operation would require designing the system components for use over a wide pressure range rather than at a substantially uniform pressure and would thereby increase the cost of these components.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. A heat transport system having a coolant containing fine solid particles suspended in a gas and comprising walls forming a vessel containing a heat source, a heat exchanger spaced from said vessel, a closed coolant circuit for continuously passing the coolant through said vessel wherein it absorbs heat from the heat source and through said heat exchanger wherein it gives up the heat absorbed in said vessel, means disposed in said closed circuit for circulating the coolant therethrough, a coolant by-pass circuit connected at its inlet and outlet ends to separate parts of said closed coolant circuit, a separator positioned in said coolant by-pass circuit to separate coolant received from said closed coolant circuit into a light phase and a heavy phase, a light phase outlet from said separator to return said separated light phase to the by-pass circuit downstream from the point at which said separator receives the coolant from said closed coolant circuit, a heavy phase storage vessel connected to said separator to receive said separated heavy phase therefrom, means for controlling flow into and out of said coolant by-pass circuit, and means for adding said heavy phase taken from said storage vessel into said coolant by-pass circuit downstream from the connection of said light phase outlet to said by-pass conduit.

2. A heat transport system having a coolant containing fine solid particles suspended in a gas and comprising walls forming a vessel containing a heat source, a heat exchanger spaced from said vessel, a closed coolant circuit for continuously passing the coolant through said vessel wherein it absorbs heat from the heat source and through said heat exchanger wherein it gives up the heat absorbed in said vessel, means disposed in said closed circuit for circulating the coolant therethrough, a coolant by-pass circuit connected at its inlet and outlet ends to separate parts of said closed coolant circuit, a separator positioned in said coolant by-pass circuit to separate coolant received from said closed coolant circuit into a light phase and a heavy phase, a light phase outlet from said separator to return said separated light phase to the by-pass circuit downstream from the point at which said separator receives the coolant from said closed coolant circuit, a heavy phase storage vessel connected to said separator to receive said separated heavy phase therefrom, valve means for controlling flow into and out of said coolant by-pass circuit, means for adding said heavy phase taken from said heavy phase storage vessel into said coolant by-pass circuit downstream from the connection of said light phase outlet to said by-pass conduit, and control means responsive to variations in the rate of heat generated in said vessel to thereby selectively regulate said valve means and said means for said heavy phase into said by-pass circuit.

3. A heat transport system having a coolant containing fine solid particles suspended in a gas and comprising walls forming a vessel containing a heat source, a heat exchanger spaced from said vessel, a closed coolant circuit for continuously passing the coolant through said vessel wherein it absorbs heat from the heat source and through said heat exchanger wherein it gives up the heat absorbed in said vessel, a coolant pump disposed in said closed circuit for circulating the coolant therethrough, a coolant by-pass circuit connected at its inlet and outlet ends to separate parts of said closed coolant circuit, an inlet valve located in said by-pass circuit at its inlet end, an outlet valve positioned in said by-pass circuit at its outlet end, control means to regulate said inlet and outlet valves, a separator located in said coolant by-pass circuit between said inlet and outlet valves to separate coolant received from said closed coolant circuit into a light phase and a heavy phase, a light phase outlet from said separator to return said separated light phase to the by-pass circuit downstream from the point at which said separator receives the coolant from said closed coolant circuit, a heavy phase storage vessel connected to said separator to receive said separated heavy phase therefrom, a heavy phase conduit connected at its inlet end to said heavy phase storage vessel and at its outlet end to said by-pass circuit at a point between said separator and said outlet valve, a feeder device located in said heavy phase conduit to receive said heavy phase from said heavy phase storage vessel and to feed said heavy phase into and through said by-pass conduit, second control means to operate said feeder device, and a control system responsive to variations in the rate of heat generated in said vessel to thereby regulate said first and second control means.

4. A heat transport system having a coolant containing fine solid particles suspended in a gas and comprising walls forming a vessel containing a source of heat, a heat exchanger spaced from said vessel, a closed coolant circuit for continuously passing the coolant through said vessel wherein it absorbs heat from the heat source and through said heat exchanger wherein it gives up the heat absorbed in said vessel, a coolant pump disposed in said closed circuit for circulating the coolant therethrough, a coolant by-pass circuit connected at its inlet and outlet ends to separate portions of said closed coolant circuit, an inlet valve located in said by-pass circuit at its inlet end, an outlet valve positioned in said by-pass circuit at its outlet end, a separator located in said coolant by-pass circuit between said inlet and outlet valves to separate coolant received from said closed coolant circuit into a light phase and a heavy phase, a light phase outlet from said separator to return said separated light phase to the by-pass circuit, a shut-off valve disposed in said by-pass circuit at said light phase outlet from said separator, first control means to regulate said inlet, outlet and shut-off valves, a heavy phase storage vessel connected to said separator to receive said separated heavy phase therefrom, heavy phase conduit connected at its inlet end to said heavy phase storage vessel and at its outlet end to said by-pass circuit at a point between said shut-off valve and said outlet valve, a heavy phase pump located in said heavy phase conduit to receive said heavy phase from said heavy phase storage vessel and to flow the heavy phase into and through said by-pass conduit, second control means to operate said heavy phase pump, and a control system responsive to variations in the rate of heat generated in said vessel to thereby regulate said first and second control means.

References Cited in the file of this patent
UNITED STATES PATENTS

| | | |
|---|---|---|
| 2,332,527 | Pyzel | Oct. 26, 1943 |
| 2,966,232 | Austin | Dec. 27, 1960 |